Figure 1:
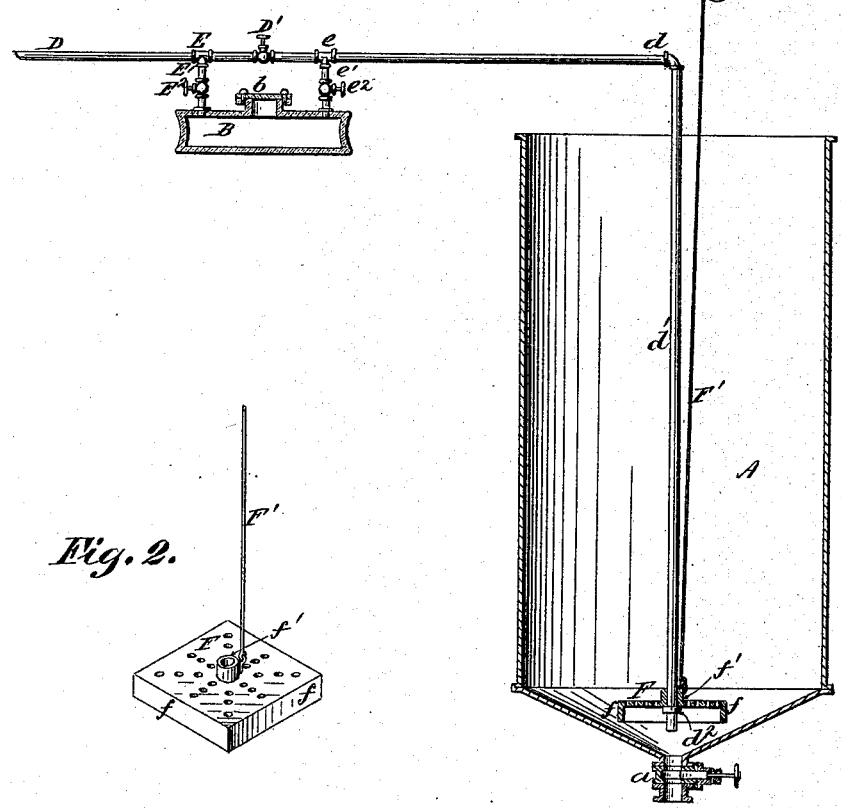

(Specimens.)

E. D. KENDALL.
PROCESS OF FREEING MALODOROUS HYDROCARBONS FROM OFFENSIVE ODORS.

No. 413,187. Patented Oct. 22, 1889.

Witnesses:
A. M. Jones
D. W. Gardner

Inventor:
E. D. Kendall,
Per Edw. E. Lynch,
Atty.

UNITED STATES PATENT OFFICE.

EDWARD D. KENDALL, OF BROOKLYN, NEW YORK, ASSIGNOR TO THE WESTERN OIL REFINING COMPANY, OF NEW YORK.

PROCESS OF FREEING MALODOROUS HYDROCARBONS FROM OFFENSIVE ODOR.

SPECIFICATION forming part of Letters Patent No. 413,187, dated October 22, 1889.

Application filed December 11, 1888. Serial No. 293,258. (Specimens.)

*To all whom it may concern:*

Be it known that I, EDWARD D. KENDALL, of Brooklyn, New York, have invented certain new and useful Improvements in the Process of Freeing Malodorous Hydrocarbons from Offensive Odor, of which the following is a specification.

This invention relates to the purification of hydrocarbons.

The object is, in a ready and efficient manner, to free malodorous hydrocarbon substances—particularly certain petroleums—from offensive odor.

The invention consists in freeing malodorous hydrocarbons from offensive odor by subjecting the same to the action of chloride of sulphur, preferably of sulphur monochloride, ($S_2Cl_2$.)

As is well known, certain crude petroleums—such as Ohio or Lima petroleum, and Canadian petroleum and the so-called "distillate" or burning-oil produced therefrom by fractional distillation—contain malodorous substance or substances, being sulphur compounds, which render the petroleum offensive in use. I have found that by subjecting the hydrocarbon to the action of chloride of sulphur the same may be freed from offensive odor and be rendered unobjectionable in this respect, and fitted, after the usual treatment with sulphuric acid, alkali, and water, for immediate use.

To carry my invention into effect, the described hydrocarbon is placed in a suitable receptacle and heated with chloride of sulphur, either by having volatilized chloride of sulphur forced through it, as by being blown through the air, or by having a solution of chloride of sulphur in refined petroleum mixed with it. The chloride of sulphur reacts upon the malodorous bodies in such manner as to render the oil inoffensive and the resulting sulphur bodies therein capable of separation, as partly by the adding of a sufficient quantity of oxide of lead, or, better and more fully, by a treatment fully described in another pending application for patent, filed March 12, 1889, Serial No. 303,015, whereupon the hydrocarbon can readily be distilled off.

The accompanying drawings represent a form of apparatus for treating hydrocarbon with chloride of sulphur which is particularly effective, but which does not constitute any part of the present invention, and is here shown and described merely for the purpose of illustration.

The said apparatus consists of an agitator-tank, a volatilizing-chamber for containing chloride of sulphur, and suitably-arranged pipes for conducting currents of air under pressure through said chamber, and thereby volatilizing the chloride of sulphur, and then conducting the resulting vapor and air to the lower part of the agitator, and a distributer for directing the said vapor through the entire body of hydrocarbon contained in the agitator-tank.

Figure 2:
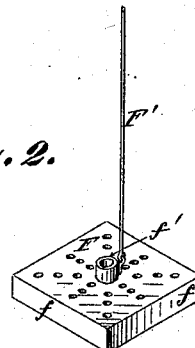
Figure 3:
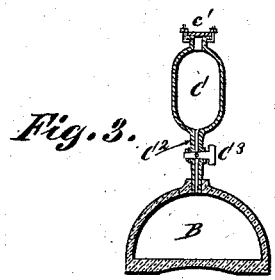

The drawings are as follows:

Figure 1 represents, in vertical section, the agitator-tank, a volatilizing-chamber, and suitably-arranged pipes for conducting air under pressure through said chamber and into the agitator-tank. Fig. 2 is an isometrical perspective of the distributer; and Fig. 3 is a vertical section taken through the plane indicated by the line $x\ x$ on Fig. 1, showing the reservoir for containing chloride of sulphur, which may be arranged in permanent connection with the volatilizing-chamber.

The detail of the apparatus shown in the drawings will sufficiently appear in the subjoined description of the manner of carrying out the present process. Thus the hydrocarbon to be treated is introduced into the agitator-tank A, the discharge-valve $a$ at the bottom thereof being closed. There is introduced into the volatilizing-chamber B a sufficient quantity of chloride of sulphur to cover the bottom of the chamber, and the chamber is then closed by the application of the stopper or cover-plate $b$. Preferably the volatilizing-chamber will be supplied with chloride of sulphur from a superposed reservoir C, provided with a stopper or cover C' for closing the inlet through which the chloride of sulphur is introduced into it and connected at the bottom with the volatilizing-chamber by means of a tube $C^2$, provided with a stop-cock $C^3$, as illustrated in Fig. 2. Air under pressure of, say, ten pounds to the inch, is supplied to the main air-pipe D from any suitable compressor. The section $d$ of the main air-pipe is connected to the upper end of the vertical pipe $d'$, which extends down to near the bottom of the agitator-tank A. In convenient proximity to the opposite extremities, respectively, is the volatilizing-chamber B. The main air-pipe D is provided with the T-coupling E $e$, and midway between these couplings is provided with a valve $D'$. Branch pipes $E'$ $e'$, provided, respectively, with the valves $E^2$ $e^2$, connect the T-couplings E and $e$, respectively, with the opposite extremities of the volatilizing-chamber.

In operation it is preferred to at first moderately agitate the hydrocarbon in the tank by the introduction of compressed air. To this end the valve $D'$ in the main air-pipe is opened and the valves $E^2$ and $e^2$ in the branch pipes are closed, after which, when it is desired to subject the hydrocarbon in the tank A to the action of chloride-of-sulphur vapor, the valve $D'$ is partially or entirely closed, so as to direct any desired portion of the air-current through the volatilizing-chamber B. A greater or less portion of the air under pressure entering the pipe D is thus forced to travel through the branch pipe $E'$ and across the surface of the chloride of sulphur contained in the volatilizing-chamber, and thence, through the branch pipes $e'$, back to the main air-pipe and down the vertical pipe $d'$ to the lower part of the agitator-tank A, carrying with it the chloride-of-sulphur vapor, with which it has become mingled while passing through the volatilizing chamber. In order to effect a wide distribution of the air charged with chloride-of-sulphur vapor thus introduced, there is employed a distributer, which consists of a perforated plate F, provided at its edges with downwardly-projecting flanges $f$ and provided with a central hub $f'$, enabling it to slide up and down the vertical pipe $d'$. Preparatory to introducing the chloride-of-sulphur vapor into the tank A the distributer is lowered to the position in which it is shown in Fig. 1, wherein it is represented as resting upon the collar $d^2$, affixed to the lower part of the pipe $d'$. The chloride of sulphur is to be supplied to the volatilizing-chamber from time to time in limited quantities, as may be required, and for this purpose it will be found convenient to employ the superposed reservoir C, to which reference has been made. The vaporized chloride of sulphur reacts upon the malodorous bodies present in the body of the hydrocarbon, causing the formation of new compounds, which possess such new qualities that they are separable from hydrocarbon. The treatment with the chloride of sulphur is continued until the unpleasant odors of the original hydrocarbon in the tank A cease to be discoverable. In practice from time to time a few cubic centimeters of hydrocarbon taken from the tank A are shaken in a test-tube with dry-lime hydroxide, or with a few drops of alkaline solution, and the odor from the test-tubes is then observed. The entire absence of the former offensive odor shows that the treatment with chloride of sulphur has been prolonged for a sufficient length of time, and it is then discontinued by shutting off the air-blast from the volatilizer, which is effected by closing the valves $E'$ $e'$. The valve $D'$ is then opened and the air-blast conducted into the tank A for the purpose of energetically agitating its contents. During such agitation the distributer F is preferably hoisted up out of the way, which is effected by means of the hoisting-rope or chain $F'$. While the hydrocarbon in the tank is being energetically agitated by a strong air-blast, alkali or alkaline earth, as soda or lime—say milk of lime—or a soda solution of about 15° Baumé, is introduced into the tank in quantity sufficient to neutralize acid bodies and eliminate any free chloride of sulphur in the hydrocarbon. When the hydrocarbon is free from offensive odor and has been freed from acid and chloride of sulphur, the air-blast is shut off, and the alkaline solution, after having been allowed to settle out of the oil, is drawn off, after which the air-blast is renewed and the hydrocarbon is agitated with successive portions of water, which are in turn allowed to settle and are drawn off until all matters soluble in water are removed. If lime be used as a neutralizing agent, it may be more convenient to employ a second agitator-tank for containing the hydrocarbon during the continuance of the refining operation, because of the desirability of removing all traces of lime and on account of the difficulty of completely removing the lime from the tank in which the neutralization is effected.

Instead of conveying the chloride of sulphur into the hydrocarbon contained in the tank A by means of the air-blast, as has been described, the chloride of sulphur may be dissolved in refined petroleum and successive portions of the solution be added to the hydrocarbon in the tank and be mingled therewith by means of the air-blast. It is preferred, however, to employ the volatilizer, chiefly because when the volatilizer is employed cheap crude chloride of sulphur can be used, and any free sulphur contained therein will be left behind in the volatilizing-chamber.

Having thus fully described my invention, what I claim as new, and desire to secure by Letters Patent, is—

The process of freeing malodorous hydrocarbons from offensive odor, which consists in subjecting the same to the action of chloride of sulphur, substantially as described.

EDWARD D. KENDALL.

Witnesses:
A. M. JONES,
EDW. E. QUIMBY.

It is hereby certified that in Letters Patent No. 413,187, granted October 22, 1889, upon the application of Edward D. Kendall, of Brooklyn, New York, for an improvement in the "Process of Freeing Malodorous Hydrocarbons from Offensive Odors," an error appears in the printed specification requiring correction, as follows: In line 35, page 1, the word "heated" should read *treated*, and that the said Letters Patent should be read with this correction therein to make the same conform to the record of the case in the Patent Office.

Signed, countersigned, and sealed this 5th day of November, A. D. 1889.

[SEAL.]

CYRUS BUSSEY,
*Assistant Secretary of the Interior.*

Countersigned:
C. E. MITCHELL,
*Commissioner of Patents.*